(No Model.)
J. V. UPINGTON.
SULKY.
No. 497,224. Patented May 9, 1893.
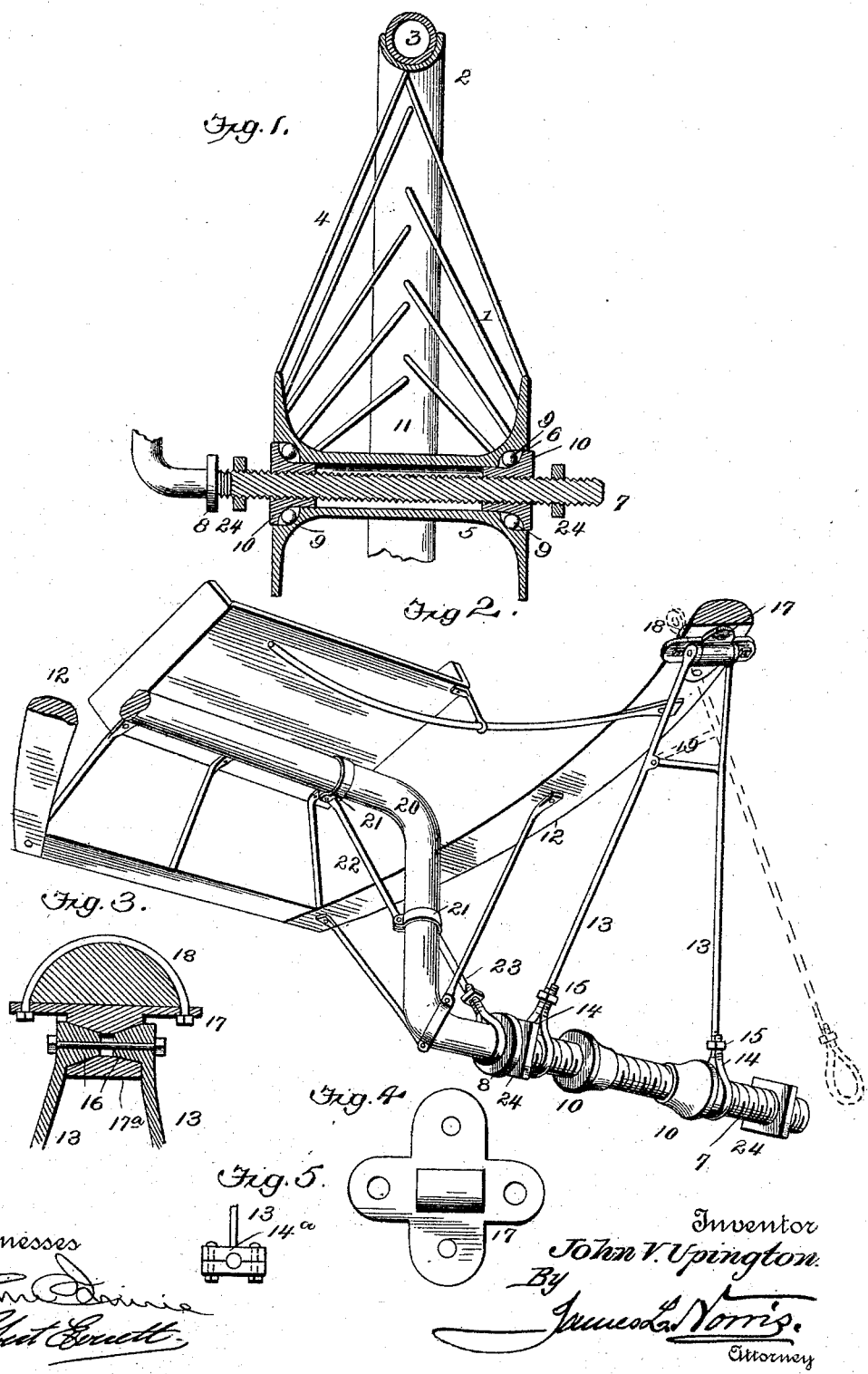
Witnesses
Inventor
John V. Upington.
By
James L. Norris.
Attorney

UNITED STATES PATENT OFFICE.

JOHN V. UPINGTON, OF LEXINGTON, KENTUCKY.

SULKY.

SPECIFICATION forming part of Letters Patent No. 497,224, dated May 9, 1893.

Application filed November 8, 1892. Serial No. 451,377. (No model.)

*To all whom it may concern:*

Be it known that I, JOHN V. UPINGTON, a citizen of the United States, residing at Lexington, in the county of Fayette and State of Kentucky, have invented new and useful Improvements in Sulkies, of which the following is a specification.

My invention relates to running gear for vehicles, and it has for its objects, to provide, first, a novel wheel-axle; secondly, peculiar and novel means for securing wheels on such axles; and thirdly, novel, simple and efficient devices for bracing and steadying the axle and the wheel when placed thereon.

To such ends my said invention consists in the novel construction, combination and arrangement and operation of parts hereinafter described and claimed, reference being made to the accompanying drawings, in which—

Figure 1, is a vertical sectional view of a portion of a bicycle, tricycle, sulky or other like wheel, mounted upon an axle constructed according to my invention. Fig. 2, is a perspective view showing a shaft and the axle bed of a sulky, provided with my improved axle and steadying or bracing devices therefor. Fig. 3, is a detail sectional view, showing the manner of connecting the braces to the shafts. Fig. 4, is a face view of the plate to which the forward ends of the braces are connected, and Fig. 5, is a modification of the means for attaching the braces to the axle.

In the said drawings the reference numeral 1, designates a wheel, such as a bicycle, tricycle, sulky or other like wheel, having as usual, a rim 2, metal, pneumatic or other rubber tire 3, and spokes 4. The wheel 1 is provided with a hub 5, at the inner and outer ends of which are counter-sunk recesses 6, and which is provided with any suitable lubricating device 6ª.

The numeral 7, represents my improved axle at the inner end of which is a collar 8. Said axle as shown in the drawings, is provided with a continuous screw thread from the collar 8, to its outer extremity, as shown. While this is the form of axle which I prefer to employ, it is evident that said axle may be provided with a screw thread running from the collar 8, a suitable distance, another screw thread running from the outer extremity of the axle a suitable distance inward, and a smooth surface intermediate the said screw threaded portions. The counter-sunk recesses 6, receive balls 9, which have a bearing contact with the hub 5, and with the exterior surface of conical ball-confining nuts 10, which are screwed up on the axle against the inner and outer ends of the hub 5.

The numerals 24 represent nuts one of which is placed upon the axle between the hub and the collar 8 and the other of which is located on said axle at its outer end, and both of said nuts 24 are adapted to be screwed up tight against the ball-confining nuts 10 and prevent the latter from turning loose and the wheel wabbling or swaying.

It will be readily understood that my invention as thus described is applicable alike to bicycles, tricycles, sulkies and other like vehicles.

The third object of my invention is to provide suitable bracing for the axle and shafts of sulkies and other like vehicles, and is particularly shown in Fig. 2, of the accompanying drawings. In this figure the numeral 12 designates shafts and the numerals 13 designate braces which are provided at their rear, lower extremities with hinge-clips 14, which are provided with an interior screw-thread and which embrace the axle 7 and which when closed are locked by a nut 15. Or instead of securing the rear ends of said braces to the axle in the manner just described, I may adopt the means shown in Fig. 5, wherein the rear ends of said braces are formed with a lateral extension 14ª, having a semicircular recess and a plate 14ᵇ provided with a similar recess is bolted to said lateral extension, the axle passing through the circular orifice formed by said semi-circular recesses. The inner one of these braces 13 is secured to the inner part of the axle between the jam nut 24 and the ball-confining nut 10, at one side of the wheel, and the other brace is similarly secured thereto between the outer ball-confining nut 10 and the outer jam nut 24, at the other side of the wheel.

From the axle 7, the braces extend forwardly and upwardly and at their front ends are provided with conical or tapering projections 16, extending inwardly therefrom, each of which projections is provided with a bolt or pinhole.

Secured to the under side of the shafts 12 at a suitable point is a plate 17, having four lateral branches through two of which the fastening nails or screws are passed to secure said plate to the shaft, and the other two of which branches project slightly beyond the sides of the shaft and are provided with holes which receive the ends of a clip 18 which embraces the shaft, suitable nuts being screwed upon the ends of said clip whereby it is securely fastened. Formed with or suitably secured to and depending from the center of the plate 17, is a socket-piece 17$^a$ provided with tapering sockets the counterpart of the tapering projections 16 on the braces 13, and which are adapted to receive said tapering projections, and through the bolt or pin-holes in said projections 16, is passed a bolt or pin, securely attaching the front ends of the braces 13 to the shafts in a secure manner, and forming an anti-rattling hinge or shackle connection between said braces and shaft.

Intermediate the ends of the braces 13 is a brace or bar 19, one end of which is rigidly secured to or formed with the outer brace 13, and the other end of which is connected to the inner brace 13 by a suitable hinge connection 19$^a$, in such manner that the outer brace may be swung out of the way so that the wheel may be placed upon and taken from the shaft without disturbing the inner brace 13.

The numeral 20 designates the axle bed or cap which is constructed of any suitable material and which curves upwardly from the axle 7 and then horizontally under the vehicle seat as shown. Clips or shackles 21 are fitted to this axle bed, one at the vertical or rising part and the other at the horizontal part under the seat. Secured at its opposite ends to these clips 21 is a brace-rod 22, and to the lower end of one of these clips is secured one end of a brace-rod 23, the other end of which is formed with an eye or clip fitting over the axle adjacent to the collar 8, and at the inside thereof as shown. When the parts are assembled the jam-nuts 24 are screwed up tightly against the braces 13, pressing them against the ball-confining nuts and holding them firmly in position.

By the construction, combination, and arrangement of parts described I provide a novel, simple and efficient mechanism whereby the wheels of vehicles are held securely in an upright position and prevented from swaying or wabbling and whereby, also, the shafts, axle and axle bed, are firmly braced and prevented from springing out of position, thus providing a vehicle which will run easily and without jar.

Having thus described my invention, what I claim is—

1. In a sulky, the combination of an axle having a continuously screw threaded spindle and a rigid collar at the inner end of the continuous screw thread, the inner and outer nuts 10 both engaging the said continuous screw thread, the wheel hub, balls between the ends of the hub and the nuts, and a sulky frame supported by braces extending to the continuously threaded spindle, substantially as described.

2. The combination with a vehicle axle, axle bed, and shafts, of braces connected with said axle and shafts, and braces connecting said axle and axle bed, substantially as described.

3. The combination with a vehicle axle and shafts, of a plate secured to said shaft and provided with a conical socket, braces secured at their rear ends to said axle and provided at their front ends with conical projections entering said conical socket, and a pin passing through said projections, substantially as described.

4. The combination with a vehicle axle and shafts, of braces connected at their rear ends to the axle and at their front ends to the shaft, and a bar located intermediate the ends of said braces rigidly connected to one of said braces and having a hinge connection with the other of said braces, substantially as described.

5. The combination with a vehicle axle and shafts, of braces connecting said axle and shafts, a wheel mounted on said axle, and nuts for holding said braces against said wheel, substantially as described.

In testimony whereof I have hereunto set my hand and affixed my seal in presence of two subscribing witnesses.

JOHN V. UPINGTON. [L. S.]

Witnesses:
W. S. McCHESNEY,
J. E. DELPH, Jr.